United States Patent Office 3,069,376
Patented Dec. 18, 1962

3,069,376
WATER RESISTANT CARBOXY-EPOXY AQUEOUS COATING COMPOSITIONS
Oliver I. Cline, Jr., Louisville, Ky., assignor to Devoe and Raynolds Company, Inc., a corporation of New York
No Drawing. Filed Mar. 26, 1958, Ser. No. 723,983
5 Claims. (Cl. 260—29.6)

The rapid public acceptance of aqueous emulsion coating compositions has brought about tremendous developments in polymer emulsions over the last few years. Irrespective of this rapid progress, however, such emulsion coatings are not extensively used as industrial finishes where baked-on films are in demand. In the field of industrial finishing, paints are a constant threat to safe plant operation. Although paints may not be the cause of fires, they contribute one more source of inflammable material to feed spreading flames. Hence, water-based coating compositions are much more suitable. Besides the reduction in fire hazard when water is used instead of flammable solvents, there are also other reasons for the demand for water-based coating compositions by industrial finishers. Water is cheap, readily available and odor-free. Moreover, in industries such as the automobile industry where wet sanding with water is commonplace, paints adhering to damp surfaces are extremely desirable. They eliminate a drying step and thus permit faster production.

In spite of the desire for aqueous emulsions of synthetic polymers for industrial use, the use of such polymer emulsions industrially has been limited because resulting films are too sensitive to water for use on automobiles, appliances and the like. Water resistant films have been made from copolymers of acrylic and crotonic acids. However, only low solids content emulsions can be made and these are undesirable when pigmented compositions are preferred. A pigmented composition, if made from such a low solids copolymer emulsion, would be either a low solids paint or a paint having poor hiding power. In a low solids paint, the film would be too thin. If pigment were used to properly balance the formulation, the paint would have low hiding power. Accordingly, copolymers of crotonic and acrylic acids are not entirely satisfactory for use in water insensitive emulsion paints.

In accordance with this invention, high solids aqueous emulsion coatings which are extremely water insensitive are provided. Emulsions of a synthetic interpolymer and a resin are provided which exhibit a remarkable degree of water resistance. The emulsions are also markedly stable at room temperature. The invention thus includes a dispersion of two components in an aqueous medium by means of a non-ionic surfactant. One component is an interpolymer and the other is an ethoxyline resin. The interpolymer is formed from 25 to 60 parts by weight of a butenedioic acid half ester of a saturated monohydric alcohol of from 6 to 10 carbon atoms, and from 75 to 40 parts by weight, the total being 100 parts, of certain short chain monounsaturated aliphatic monoesters, as will be described. Ethoxyline resins are well known, the resin in this instance being a liquid ethoxyline or a solid ethoxyline dissolved in a solvent so that when the resin is combined with the interpolymer it can be readily dispersed by means of the surfactant. While I do not intend to be bound by any theory of this invention, it is my belief that water insensitivity results from the desolubilization of the non-ionic surfactant by virtue of the fact that it is not only a surface active agent but a reactant as well. The action of functional groups of the surfactant tie the surface active agent into the molecule. The invention thus contemplates a reaction of the interpolymer, the ethoxyline resin and the surfactant.

As indicated, the monomers which are employed in the formation of the interpolymers are the butenedioic acid half ester of a monohydric alcohol of from 6 to 10 carbon atoms and the short chain monounsaturated monoester. The monounsaturated monoaliphatic monoesters are acrylic, methacrylic and crotonic acid esters of saturated aliphatic monohydric alcohols of 2 to 4 carbon atoms and vinyl alcohol esters of saturated aliphatic monocarboxylic acids of less than 5 carbon atoms. By vinyl alcohol esters are intended such esters as vinyl acetate, vinyl propionate and vinyl butyrate, which, while not made from vinyl alcohol, are nevertheless named as derivatives thereof. The monounsaturated monoesters include alkyl esters, containing at least 2 and not more than 4 carbon atoms, of acrylic, methacrylic and crotonic acids such as methyl, ethyl, propyl, isopropyl, N-butyl, sec-butyl, and tert-butyl esters of acrylic, methacrylic and crotonic acids. Other unsaturated acid esters within the contemplation of this invention are such esters as vinyl acetate, vinyl propionate, and vinyl butyrate.

The butenedioic acid half ester which is copolymerized with the monounsaturated monoester is prepared by the reaction of one mol of a butenedioic acid with one mol of a monohydric alcohol. By a butenedioic acid is meant an unsaturated dibasic acid of the formula: HOOCCR:CRCOOH, where R is a hydrogen or methyl substituent. Included are cisbutenedioic acid (maleic acid), transbutenedioic acid (fumaric acid), methyl butenedioic acid (citraconic acid), and mesaconic acid. It is noted, however, that the anhydride, where it exists, is preferred for use in the preparation of the half ester.

Alcohols forming the half esters are aromatic, saturated aliphatic and cyclic monohydric alcohols each having from 6 to 10 carbon atoms. Examples are hexyl alcohol, heptyl alcohol, cetyl alcohol, decyl alcohol. Aromatic alcohols as used herein are compounds having an aromatic nucleus on an aliphatic side chain in which a hydroxyl group has replaced a hydrogen atom in the side chain, as in benzyl alcohol. In fact, monobenzyl maleate is our preferred half ester. Particularly good results are obtained with this maleate. Other suitable aromatic monohydric alcohols are alpha-alpha dimethyl benzyl alcohol, alpha ethyl benzyl alcohol, alpha propyl benzyl alcohol, and the like. Suitable cyclic alcohols are 2-ethyl cyclohexanol, propyl cyclohexanol, etc.

The copolymer forming one component of this invention is formed by the interpolymerization of the half ester and alpha-beta monounsaturated monoester in accordance with well-known emulsion polymerization methods. While interpolymerization is effected through the use of selected emulsifying agents, other conditions follow known procedures. Interpolymerization is best effected below about 85° C. A preferred range is 15° C. to 80° C., although slightly lower and somewhat higher temperatures are permissible.

Highly water resistant films do not result when there are too few carboxyl groups in the copolymer. Accordingly, the half ester and alpha-beta monounsaturated monoester monomers are employed in proportions resulting in a polymer with a sufficient number of carboxy radicals to form water insensitive films. Generally, based on 100 parts of monomers, at least 25 parts are half ester. It is usually unnecessary to use more than 60 parts of half ester. The remaining 75 to 40 parts are, of course, alpha-beta monounsaturated monoester.

As polymerization catalysts there are used one or more peroxides which are known to act as free radical catalysts and which are somewhat soluble in aqueous solutions of the emulsifier. Highly convenient are the persulfates, including ammonium, sodium and potassium persulfates or hydrogen peroxide or the perborates or percarbonates. But organic peroxides, either alone or in addition to an inorganic peroxidic compound, can also be used. Typical organic peroxides include benzoyl peroxide, tert-butyl hydroperoxide, cumene peroxide, tetralin peroxide, acetyl peroxide, caproyl peroxide, tert-butyl perbenzoate, tert-butyl diperphthalate, methyl ethyl ketone peroxide, etc., the preferred organic peroxides having at least partial solubility in the aqueous medium containing the emulsifying agent. Choice of inorganic or organic peroxidic catalyst depends in part upon the particular combination of monomers to be interpolymerized, some of these responding better to one type than the other.

The amount of peroxidic catalyst required is roughly proportional to the concentration of the mixture of monomers. The usual range is 0.01 percent to 3 percent of catalyst with reference to the weight of the monomer mixture. The preferred range is from 0.05 percent to 0.5 percent, while the range of 0.1 percent to 0.25 percent is usually best. The optimum amount of catalyst is determined in large part by the nature of the particular monomers selected, including impurities which accompany particular monomers.

In order to effect interpolymerization at a temperature below that at which coagulation might occur, it is desirable to activate the catalyst. This may best be accomplished by using a so-called redox system in which a reducing agent is present in addition to the peroxidic catalyst. Many examples of such systems are known. Agents such as hydrazine, or a soluble sulfite, including hydrosulfites, sulfoxalates, thiosulfates, sulfites, and bisulfites can be used. Examples of these are sodium hydrosulfite, sodium metabisulfite, potassium sulfite, zinc formaldehyde-sulfoxalate, and calcium bisulfite. Redox systems may be activated by the presence of a small amount of polyvalent metal ions. Ferrous ions are commonly effectively thus used, a few parts per million being sufficient. The peroxidic catalyst may also be activated by the presence of tertiary amines which are soluble in the reaction medium, such as dimethylethanolamine or triethanolamine or by the use of diazo ethers such as p-methoxyphenyl, diazo-2-naphthyl ether.

The surfactants which are necessary to react with and to disperse or emulsify the present combinations of monomers and to maintain the formed interpolymers in stable suspension are non-ionic surface active agents. These are composed of a hydrophobic or hydrocarbon portion and a hydrophilic portion, which is a polyether chain usually terminated with an alcoholic hydroxyl group. This hydrophilic chain is of sufficient size to render the agents water-soluble. Non-ionic surfactants usually include the following: ethylene oxide derivatives of phenols, for instance, alkylphenoxypolyethoxyethanols having alkyl groups of about 7 to 18 carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more mols of ethylene oxide with nonyl, dodecyl, tetradecyl, t-dodecyl, and the like mercaptans or with alkylthiophenols having alkyl groups of 6 to 15 carbon atoms; ethylene oxide derivatives of long-chained carboxylic acids, such as lauric, myristic, oleic, palmitic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; also ethylene oxide condensates of long-chained or branch-chained amines, such as dodecylamine, hexadecylamine, and octadecylamine, containing 6 to 60 oxyethylene groups; block copolymers of ethylene oxide and propylene oxide comprising a hydrophobic propylene oxide section combined with one or more hydrophilic ethylene oxide sections.

As is well known to those skilled in the art, the surfactant is employed in an amount sufficient to form a stable emulsion. If too little surfactant is employed, the emulsion is unstable and, on the other hand, there is generally no reason for employing more than the quantity necessary for a stable emulsion. The amount of surfactant employed can best be expressed in terms of 100 parts of resin, that is, the combination of the two components. In other words, the interpolymer and the ethoxyline resin are considered combined and based on 100 parts of this combination from 2 to 6 parts of surfactant are generally employed. While non-ionic surface active agents are necessary for water insensitivity, some ionic surfactants can be used in combination with the non-ionic surface active agent, though not necessarily with equivalent results since films will be more water sensitive. For this reason, the non-ionic surfactant should always be used in major quantities. In other words, while over forty percent ionic emulsifier can be used, films will not be as resistant to water.

When an ionic surfactant is used in combination with a non-ionic emulsifier, the ionic surface active agent can be introduced at any stage of the process. Thus, interpolymerization can be carried out in the presence of the mixture of surfactants or interpolymerization can be carried out in the presence of a non-ionic surface active agent and the ethoxyline resin component can be emulsified with the ionic emulsifier or the ionic/non-ionic surfactant mixture. Ionic surfactants thus include both anionic and cationic molecules. However, cationic surfactants are not recommended when pigments are required. Anionic surfactants are preferred in any event, typical anionic surfactants including three hydrophilic groups, carboxyl sulfate ester and sulfonic. Anionic surface active agents thus include fatty soaps, rosin soaps, sulfated fatty alcohols marketed as "Tergitols," sulfated oils and fats, petroleum sulfonates, aryl alkyl sulfonates and sulfosuccinic esters.

The film-forming composition of this invention is prepared by blending together the half ester interpolymer emulsion and the ethoxyline resin or resin emulsion. Relative amounts of the two emulsions to be used in the final composition, or vehicle, is dictated by the properties desired. Theoretically, maximum curing takes place if there is present in the vehicle one epoxide group of ethoxyline resin for each carboxyl group in the quantity of copolymer used to form the vehicle, and one epoxide group for each hydroxyl group in the surfactant required to suspend that quantity of copolymer, the ethoxyline resin, and pigments, if any are used. This, of course, does not allow for any reaction of diepoxide with the secondary hydroxyl groups created when an epoxide group reacts with a carboxyl group or a hydroxyl group. While the theoretical approach leads to maximum reaction, it is best to use an empirical rather than theoretical approach because film properties vary considerably depending upon the ratio of interpolymer to ethoxyline resin. In general, therefore, from 9 to 99 parts of the ethoxyline resin component are combined with 1 to 91 parts by weight of the interpolymer component, 100 parts total being used in any mixture. The ratio of the two components within this range will depend upon the film properties desired and selection will be made on that basis.

Ethoxyline resins are generally known and need not be described at length. An ethoxyline resin, or a polyepoxide as it is often called, is a complex polyether derivative of a polyhydric organic compound, said derivative containing 1,2-epoxy groups. These ethoxyline compounds are resinous reaction products of epihalohydrins and alcohols or phenols having at least two alcoholic or phenolic hydroxyl groups. The preparation of such glycidyl polyethers of alcohols and phenols is described in such patents as U.S. 2,615,007, 2,615,008, 2,582,985, 2,485,160 and 2,581,464. While it is preferred to use normally liquid ethoxyline resins which can be dispersed in the aqueous medium, for example, those melting below 30° C., it is understood that solid ethoxyline resins can be dissolved in a solvent or dispersed at an elevated temperature, and then be dispersed in an aqueous medium through the use of the surfactant. Accordingly, any ethoxyline resin can be used in accordance with the invention. In general, however, ethoxyline resins having weights per epoxide below 1000 will be used since higher molecular weight ethoxylines will be less efficient cross-linking agents.

When a solvent is used, a strong solvent is necessary because of the solubility characteristics of the glycidyl polyether. In other words, a polar solvent is used rather than a non-polar solvent, e.g., such polar solvents as ethers, esters and ketones. For this purpose, suitable solvents are ethers such as "Dioxane" (glycol ethylene ether), the "Cellosolves" such as ethyl "Cellosolve" (2-ethoxyethanol), butyl "Cellosolve" (butoxyethanol), and "Cellosolve" acetate (2-ethoxyethanol acetate), etc.; ketones such as acetone, methyl ethyl ketone, methyl isobutyl ketone, diisobutyl ketone, etc.; and mixtures of ketone solvents and ether solvents with aromatic hydrocarbon solvents, such as xylene, toluene, benzene, etc.

To bring about the reaction of the two components to form water resistant coatings, films of the coating composition are baked to bring about the reaction of the two components and a surfactant to form cross-linked thermoset films. Cross-linking or curing generally takes place in the 100–250° C. temperature range depending upon whether or not a catalyst is employed. In the absence of a catalyst, it will be desirable to bake the films at 200° C. whereas a baking schedule of about 150° C. and about 30 minutes is sufficient if a carboxy-epoxy catalyst is employed. These epoxy-carboxy catalysts are generally basic materials and are well known in the art, for example, amines, amine salts, quaternary ammonium hydroxides, and quaternary ammonium salts. Any of the catalysts which are activators for epoxy-carboxy reactions can be used. However, amine catalysts latenized by salt formation are preferred because they yield pot stable systems as well as increasing the probability of reaction between the primary hydroxyl groups of the surfactant system and the epoxide group. In this connection, quaternary ammonium salts containing organic anions have been found more effective than quaternary ammonium salts containing inorganic anions such as benzyl trimethyl ammonium chloride. These quaternary ammonium salts are not particularly useful as catalysts in the system provided herein because they are too water-soluble. For the purposes of this invention, it is desirable to render the catalysts water-insoluble and oil-soluble since the catalysts should be divided between the two phases. Especially suitable catalysts are the 2-ethyl hexoate salt of dimethyl amino methyl phenol, alpha-methyl benzyl dimethyl ammonium 2-ethyl hexoate, the tri-2-ethyl hexoate salt of 2,4,6-tri(dimethyl amino methyl)phenol, benzyl dimethyl ammonium 2-ethyl hexoate, and benzyl trimethyl ammonium 2-ethyl hexoate. Examples of other catalysts are trimethyl amine, triethyl amine, ethyl dipropyl amine, benzyl trimethyl ammonium hydroxide, benzyltrimethyl ammonium chloride, ethyl pyridine chloride, alpha-methyl benzyl dimethyl ammonium 2-ethyl hexoate, etc. In view of the fact that a carboxyl copolymer has residual acidity which can be used to form amine salts, pure amines such as benzyl dimethyl amine, alpha-methyl benzyl dimethyl amine, dimethyl amino methyl phenol, and 2,4,6-tri(dimethyl amino methyl)phenol are also useful.

With respect to the amount of epoxy-carboxy catalyst, results indicate that, in the case of an amine, a pot stable system cannot be obtained with a catalyst concentration that will give greater than one amino nitrogen per carboxyl group contained in the copolymer portion of the vehicle. Preferably, there should be not greater than 0.8 amino nitrogens per carboxyl group. The lower limit of catalyst concentration will be governed by the epoxide concentration. As low as 0.055 amino nitrogens per epoxide group has been found to give acceptable cure. Below this level, the films are brittle or possess poor surface mar resistance or else they remain tacky. In the case of amine salts and other latenized amine catalysts only the lower limit is critical. In other words, as much as 10 percent or more by weight based on the ethoxyline resin of these catalysts can be used. It will generally be unnecessary to use more than 5 percent since in most instances properties will not be improved thereby. It appears that each vehicle composed of a blend of the carboxy-containing copolymer emulsion and an emulsion of a diepoxide has two limitations placed upon the amount of catalyst that can be employed. Some blends will afford the use of a wide range of catalyst concentrations, while in others the range will be narrow and conceivably, the demands of the epoxide groups for catalyst in those emulsion blends containing high concentrations of diepoxide could be greater than the carboxy-containing copolymer would allow for a pot stable system.

In order more fully to illustrate the invention, the following examples are included. The examples are for the purposes of illustration only and it is intended that no undue limitation be read into the invention by reference to the examples and the discussion thereof. In the examples which are directed to films employing the ethoxyline resin, a resin is used prepared according to a procedure well known in the art by the condensation of ten mols of epichlorhydrin with one mol of bisphenol in the presence of two mols of sodium hydroxide. This ethoxyline resin, with a weight per epoxide group of 190, will be designated as Ethoxyline Resin 190 in the examples as follow.

EXAMPLE 1

*Monobenzyl Maleate-Methyl Acrylate Copolymer Emulsion*

| Components | Parts by weight | Parts/100 parts monomer |
| --- | --- | --- |
| Colloid [1] (based on solids) | 16.3 | 4.1 |
| Emulsifier [2] (based on solids) | 4.0 | 1.0 |
| Distilled water | 437.0 | 109.0 |
| t-Butyl hydroperoxide | 6.4 | 1.7 |
| Methyl acrylate | 240.0 | |
| Monobenzyl maleate | 160.0 | |

[1] Hydroxyethyl cellulose.
[2] Condensation product of octyl phenol and ethylene oxide having on the average about 30 mols of ethylene oxide per mol of octyl phenol (70 percent aqueous solution).

Into a two liter, round-bottomed, three-necked flask fitted with a thermometer, reflux condenser, mechanical agitator and two dropping funnels are charged, a portion (204.0 grams) of the distilled water, 168.0 grams of a 9.7 percent aqueous solution of the colloid and 5.6 grams of a 70.0 percent aqueous solution of the emulsifier. Into one of the dropping funnels is poured a monomer premix solution prepared by blending together, in a suitable container, 160.0 grams of melted monobenzyl maleate and 240.0 grams of methyl acrylate until complete solution results, the total volume being approximately 390 cc. Into the second dropping funnel is placed a catalyst solution made by warming gently 6.4 grams of t-butyl hydroperoxide in 80.0 grams of distilled water until solution occurs. The volume of catalyst solution is about 90 cc.

Agitation of the flask contents is initiated at a speed of about 250 r.p.m. and 40 cc. (about 10 percent) of the monomer premix and 10 cc. (about 10 percent) of the catalyst solution are introduced into the flask. The flask contents are then heated to a moderate reflux temperature (85° C. to 90° C.) whereupon the remaining monomer premix and catalyst solution are added to the reaction mixture in a dropwise manner at such a rate that about 45 cc. of monomer premix and 10 cc. of catalyst solution are introduced over a fifteen minute interval, maintaining the temperature between 88° C. and 91° C. throughout the addition. After all of the monomer premix and catalyst solution are added, the temperature of the reaction mixture is allowed to rise to 93° C. and is maintained at this temperature for fifteen minutes after which the flask contents are allowed to cool to room temperature. The carboxyl-containing copolymer emulsion prepared has an acid value of 178 and a solids content of 38 percent as determined by heating for 1 hour at 180° C.

EXAMPLE 2

A carboxyl-containing copolymer emulsion with a solids content of 42 percent and an acid value of 131 is prepared following the procedure of Example 1 from 80.0 grams of the benzyl half ester of maleic acid and 320.0 grams of methyl acrylate.

EXAMPLE 3

According to the procedure of Example 1, a carboxyl-containing copolymer emulsion is prepared from 120.0 grams of monobenzyl maleate and 280.0 grams of methyl acrylate. This emulsion has a solids content of 41 percent and an acid value of 133.

EXAMPLE 4

From 200.0 grams of monobenzyl maleate and 200.0 grams of methyl acrylate, following the procedure of Example 1, a carboxyl-containing copolymer emulsion with a solids content of 34 percent and an acid value of 275 is prepared.

EXAMPLE 5

As shown in Example 1, a carboxyl-containing copolymer emulsion with a solids content of 40 percent and an acid value of 179 is made from 160.0 grams of monobenzyl maleate and 240.0 grams of vinyl acetate.

EXAMPLE 6

Following the procedure of Example 1, a carboxyl-containing copolymer emulsion is made using 160.0 grams of monobenzyl maleate and 240.0 grams of butyl acrylate. This emulsion has a solids content of 35 percent and an acid value of 172.

EXAMPLE 7

From 80.0 grams of the 2-ethylcycolhexyl half ester of maleic acid and 320.0 grams of methyl acrylate, following the procedure of Example 1, a carboxyl-containing copolymer emulsion having an acid value of 110 and a solids content of 42 percent is prepared.

EXAMPLE 8

A carboxyl-containing copolymer emulsion with an acid value of 159 and a solids content of 39 percent is prepared as in Example 1 from 160.0 grams of the 2-ethylhexyl half ester of maleic acid and 240.0 grams of methyl acrylate.

EXAMPLE 9

From 160.0 grams of the 2-ethylhexyl half ester of maleic acid and 240.0 grams of vinyl acetate, as set forth in the procedure of Example 1, a carboxyl-containing copolymer emulsion having a solids content of 37 percent and an acid value of 199 is made.

EXAMPLE 10

Using the procedure of Example 1, a carboxyl-containing copolymer emulsion is made from 80.0 grams of the 2-ethylhexyl half ester of maleic acid and 320.0 grams of vinyl acetate. This copolymer emulsion has an acid value of 76 and a solids content of 46 percent.

EXAMPLE 11

As set forth in the procedure of Example 1, an emulsion of a carboxyl-containing copolymer with an acid value of 151 and a solids content of 42 percent is prepared using 120.0 grams of the 2-ethylhexyl half ester of maleic acid and 280.0 grams of vinyl acetate.

EXAMPLE 12

From 160.0 grams of the 2-ethylhexyl half ester of maleic acid and 240.0 grams of butyl acrylate, as set forth in Example 1, an emulsion of a carboxyl-containing copolymer having a solids content of 41 percent and an acid value of 135 is prepared.

EXAMPLE 13

An emulsion of a carboxyl-containing copolymer with a solids content of 36 percent and an acid value of 178 is prepared, as in Example 1, using 160.0 grams of the maleic acid half ester of dipropylene glycol methyl ether and 240.0 grams of methyl acrylate.

EXAMPLE 14

*Ethoxyline Resin Emulsion*

| Components | Parts by weight | Parts/100 parts resin |
|---|---|---|
| Ethoxyline resin 190 | 1,800.0 | |
| Distilled water | 1,197.0 | 66.5 |
| Colloid [1] (based on solids) | 9.0 | 0.5 |
| Emulsifier [2] (based on solids) | 63.4 | 3.5 |

[1] Hydroxyethyl cellulose.
[2] Condensation product of octyl phenol and ethylene oxide having on the average 30 mols of ethylene oxide per mol of octyl phenol (70 percent aqueous solution).

In a two gallon metal container 1800.0 grams of Ethoxyline Resin 190 are heated to 90° C. The container, insulated for minimum heat loss, is mounted to the stage of a drill press, a 5.5 inch propeller type stirrer pitched at 45° is affixed, and agitation is initiated at 270 r.p.m. Into the agitated ethoxyline resin is slowly poured a solution of the surfactants. The surfactant solution is made by stirring until uniformly mixed, in a suitable container, 1080.0 grams of distilled water, 90.6 grams of a 70 percent solution of the emulsifier in water and 98.4 grams of a 9.2 percent aqueous solution of the colloid. The surfactant solution is added to the polyepoxide slowly until the emulsion is inverted whereupon the speed of the addition of the surfactant solution is increased. When all of the surfactant solution is thoroughly blended in, the emulsion is cooled to room temperature and is run through a 2 inch Manton-Gaulin colloidal mill using 0.005 inch clearance between plates. The resulting emulsion has a solids content of 60.9 percent.

From the combination of the carboxyl-containing copolymer emulsions and the ethoxyline resin emulsion of Example 14 together with a catalyst, cured films are prepared by baking. Preferably, the catalyst is blended into the carboxyl-containing copolymer emulsion and is allowed to stand for 16 to 24 hours whereupon the epoxide emulsion is blended into the mixture with stirring. The resulting blend of emulsions is allowed to stand for 16 to 24 hours after which films are drawn down on glass or electrolytic tin panels. These films are allowed to air dry and are then baked at 150° C. for thirty minutes to obtain cured films.

EXAMPLE 15

Following the procedure of Example 1, other carboxyl-containing copolymer emulsions are prepared from 160.0 grams of the monobenzyl maleate and 240.0 grams of methyl acrylate using other surfactants and protective colloids. The table which follows indicates the components employed in the preparation of these emulsions and the solids contents of the respective emulsions prepared.

after which the tests are repeated. In the following table, a "blush" indicates whitening due to water absorption. After soaking for seven days, hardness is again determined. The film is then allowed to air dry for one

*Table 15—Example 15*

CARBOXYL-CONTAINING COPOLYMER EMULSIONS

| No. | Surfactants | | | Protective colloid | | | Solids content, percent |
|---|---|---|---|---|---|---|---|
| | Ionic | Nonionic | Parts | Ionic | Nonionic | Parts | |
| A | Sulfate emulsifier [1] | | 13.0 | Gum arabic | | 16.3 | 43.4 |
| B | Sulfonate emulsifier [2] | | 14.0 | CMC [6] | | 16.3 | 42.0 |
| C | Sulfate emulsifier (dry) [3] | | 3.9 | Gum arabic | | 16.3 | 43.7 |
| D | | Emulsifier [4] | 5.6 | | Colloid [7] | 16.3 | 38.7 |
| E | Sulfate emulsifier [5] | | 15.7 | CMC [6] | | 16.3 | 42.8 |

[1] Sodium alkylaryl polyether sulfate.
[2] Sodium alkylaryl polyether sulfonate.
[3] Technical lauryl alcohol sulfate.
[4] Condensation product of octyl phenol and ethylene oxide having on the average 30 mols of ethylene oxide per mol of octyl phenol.
[5] Sodium sulfate derivative of 7-ethyl-2-methylundecanol-4.
[6] The sodium salt of carboxymethyl cellulose.
[7] Hydroxyethyl cellulose.

In addition, other ethoxyline resin emulsions are prepared as shown in Example 14 using 1800.0 parts of Ethoxyline Resin 190 but using other surfactants and protective colloids. The proportions of components employed in preparing these emulsions and the solids content of the respective emulsions are indicated in the following table.

*Table 15A—Example 15*

ETHOXYLINE RESIN EMULSIONS

| No. | Surfactants | | | Protective colloid | | | Solids content, percent |
|---|---|---|---|---|---|---|---|
| | Ionic | Nonionic | Parts | Ionic | Nonionic | Parts | |
| 1 | | Emulsifier [4] | 90.6 | | Colloid [7] | 9.0 | 59.5 |
| 2 | Sulfate emulsifier [1] | | 181.2 | Gum arabic | | 98.4 | 60.5 |
| 3 | Sulfonate emulsifier [2] | | 226.8 | CMC [6] | | 8.9 | 61.0 |

NOTE.—See table 15 for footnotes 1, 2, 4, 6 and 7.

From blends of these carboxyl-containing copolymer emulsions with ethoxyline resin emulsions, as described in the paragraph preceding this example, cured films are prepared. Varying combinations of the emulsions are combined in a 50/50 weight ratio (based on solids) and to each blend is added 0.4 gram of 2,4,6-tri(dimethylaminomethyl)phenol as a catalyst. In the following table, Table 15B, the components of the blends are indicated together with the determined hardness properties of their corresponding cured films.

A pencil hardness is determined on each cured film (drawn down on a glass plate). The films are then immersed in tap water at room temperature for 24 hours day after which the pencil hardness of the dried film is again measured.

*Table 15B—Example 15*

| Emulsions | | | | Pencil hardness | | | |
|---|---|---|---|---|---|---|---|
| Copolymer | | Ethoxyline | | Cured film | After 24-hour soak | After 7-day soak | Air dried 1 day |
| No. | Parts | No. | Parts | | | | |
| A[I] | 11.5 | 2[I] | 8.3 | 4H | (Blistered) F | 3B | 3H. |
| B[I] | 11.9 | 2[I] | 8.3 | H | (Blistered) F | HB | 9H. |
| C[I] | 11.4 | 2[I] | 8.3 | H | 3B | 3B | 9H. |
| E[I] | 11.7 | 2[I] | 8.3 | H | (Blistered) F | F | 9H. |
| C[I] | 11.4 | 3[I] | 8.2 | H | (Blush) F | F | H. |
| E[I] | 11.7 | 3[I] | 8.2 | H | (Blush) F | 7H | 9H. |
| D[N] | 12.9 | 3[I] | 8.2 | 3H | (Blistered) H | HB | Film separated from panel. |
| A[I] | 11.5 | 1[N] | 8.4 | 3H | H | HB | 9H. |
| B[I] | 11.9 | 1[N] | 8.4 | 2H | (Blistered) H | F | 7H. |
| C[I] | 11.4 | 1[N] | 8.4 | 2H | H | F | 8H. |
| E[I] | 11.7 | 1[N] | 8.4 | 2H | 2H | 7H | 7H. |

[I] Ionic—surfactant and protective colloids.
[N] Non-Ionic—surfactant and protective colloids.

EXAMPLE 16

In suitable containers, portions of 9.7 parts each of the carboxyl copolymer emulsion of Example 1 are blended with varying proportions of the ethoxyline emulsion of Example 14 and are allowed to stand for one day. To each of these blends is added a catalyst (kind and amount indicated in the table of this example). The blends are again allowed to stand for a day after which, from each blend, a 3 mil film is drawn down on both a glass and a tin plate. The films are allowed to air dry and are then baked at 150° C. for 30 minutes. Each of the cured films on glass plate, of the same composition as those of the table which follows, are subjected to a soak in tap water at room temperature. In every case the film shows no sign of whitening or blistering after soaking for forty days. The cured films on the tin plates are subjected to a 28" pound bump test and a 1/8" mandrel bend. The Table 16 following indicates the composition of the films and the test results of the corresponding films.

*Table 16—Example 16*

| Emulsion | | Catalyst | Catalyst, parts | Bump test (28″ pound) | Mandrel Bend (⅛″) |
|---|---|---|---|---|---|
| Copolymer, parts | Ethoxyline, parts | | | | |
| 9.7 | 6.18 | DAP [1] | 0.1 | Passed | Passed. |
| 9.7 | 6.3 | DAP [1] | 0.2 | do | Do. |
| 9.7 | 6.53 | DAP [1] | 0.4 | do | Do. |
| 9.7 | 6.18 | DAP [2] | 0.1 | Cracked | Cracked. |
| 9.7 | 6.3 | DAP [2] | 0.2 | Slight cracking | Passed. |
| 9.7 | 6.76 | DAP [2] | 0.4 | do | Do. |
| 9.7 | 6.18 | BDA [3] | 0.1 | Cracked | Do. |
| 9.7 | 6.42 | BDA [3] | 0.2 | do | Do. |
| 9.7 | 9.21 | DAP [1] | 0.4 | Passed | Do. |
| 9.7 | 7.92 | DAP [2] | 0.1 | Cracked | Cracked. |
| 9.7 | 8.15 | DAP [2] | 0.2 | Passed | Passed. |
| 9.7 | 8.98 | DAP [1] | 0.4 | Cracked | Do. |
| 9.7 | 7.81 | BDA [3] | 0.1 | do | Cracked. |
| 9.7 | 8.05 | BDA [3] | 0.2 | Passed | Passed. |
| 9.7 | 8.63 | BDA [3] | 0.4 | Cracked | Do. |

[1] 2,4,6-tri(dimethylaminomethyl)phenol.
[2] Dimethylaminomethyl phenol.
[3] Benzyldimethyl amine.

EXAMPLE 17

In a suitable container, 111.0 grams of the carboxyl copolymer emulsion prepared as in Example 1 but with a solids content of 38.0 percent, and 92.0 grams of the ethoxyline emulsion prepared as in Example 14 but with a solids content of 60.6 percent, are blended together and are allowed to stand over a period of four days. With varying portions of this emulsion blend, hereinafter called Blend A, in separate containers, are mixed thoroughly varying amounts of additional ethoxyline emulsion prepared as in Example 14 but with a solids content of 60.6 percent and these blends are again allowed to stand overnight. Into each of these blends is mixed 35.0 grams of a pigment paste. The blends are well mixed and to each is added 0.5 gram of 2,4,6-tri(dimethylaminomethyl)phenol. From each blend, films are drawn down on glass plates with a 3 mil blade and are baked for 30 minutes at 150° C. The cured films on glass are subjected to the rocker hardness test both before and after being soaked in tap water at room temperatures as a measurement of the water sensitivity of the films. Table 17 indicates the composition of the blends and the hardness properties of their corresponding cured films.

The pigment paste which is mixed with emulsion blends is made from the following materials.

| Material: | Parts by weight |
|---|---|
| Titanium dioxide | 200 |
| China clay [1] | 150 |
| Mildewicide [2] | 1 |
| Antifoam [3] | 1 |
| Emulsifier [4] | 6 |
| Ethylene glycol | 20 |
| Water | 177.9 |
| Hydroxyethyl cellulose | 200.0 |

[1] Kaolin.
[2] Sodium salt of pentachlorophenol.
[3] Defoamer.
[4] Condensation product of octyl phenol and ethylene oxide having on the average 9–10 mols of ethylene oxide per mol of octyl phenol.

The materials are mixed on a drill press and then passed through a 2″ Manton-Gaulin colloid mill using 0.005″ clearance between plates.

*Table 17—Example 17*

| Blend A, parts | Ethoxyline emulsion, parts | Rocker hardness (cured film on glass plate) | | |
|---|---|---|---|---|
| | | Before water soak | After 24-hr. water soak | After 96-hr. water soak |
| 25.0 | 0.0 | 12 | 9 | 8 |
| 23.0 | 1.7 | 13 | 9 | 10 |
| 20.8 | 3.3 | 14 | 10 | 9 |
| 18.7 | 5.0 | 13 | 9 | 9 |
| 16.6 | 6.6 | 12 | 10 | 10 |
| 14.6 | 8.3 | 13 | 10 | 11 |
| 12.5 | 10.0 | 13 | 11 | 12 |
| 10.4 | 11.8 | 12 | 11 | 8 |
| 8.2 | 12.4 | 15 | 11 | 10 |
| 6.2 | 14.0 | 14 | 12 | 11 |
| 4.0 | 15.8 | 12 | 10 | 10 |
| 2.0 | 17.4 | 11 | 12 | 8 |

EXAMPLE 18

In a suitable container, 12.5 grams of the carboxyl-containing copolymer emulsion of Example 5 and 0.4 gram of DAP [1] are mixed and allowed to stand for 24 hours. To this blend is added, 8.2 grams of the ethoxyline emulsion of Example 14. After through mixing, this blend is allowed to stand again for 24 hours. From this mixture, 3 mil films are drawn down on both a glass and a tin panel. The films are air dried and are then baked at 150° C. for 30 minutes.

The cured film, on glass, has a rocker hardness of 36 and a pencil hardness of 8H. This film after immersion in tap water for 24 hours at room temperature has a rocker hardness of 19 and a pencil hardness of 3B.

The cured film on the tin plate, when immersed in boiling distilled water, exhibits signs of blistering after 4½ hours.

EXAMPLE 19

Following the procedure of Example 18, from a blend of 13.4 grams of the carboxyl copolymer emulsion of Example 9, 8.2 grams of the ethoxyline resin emulsion of Example 14 and 0.4 gram of DAP [1], cured films are prepared on both glass and tin panels.

The cured film on the glass plate has a rocker hardness of 22 and a pencil hardness of 4H. After being soaked in tap water for 24 hours at room temperature, the film has a rocker hardness of 18 and a pencil hardness of 4H.

The cured film on the tin panel, immersed in boiling distilled water shows signs of blistering after 3 hours but does not separate from the panels.

EXAMPLE 20

As described in the procedure of Example 18, cured films are prepared from a blend of 10.4 grams of the carboxyl-containing copolymer emulsion of Example 10, 8.2 grams of the ethoxyline resin emulsion of Example 14 and 0.4 grams of DAP [1]. The films are made on both glass and tin plates. The cured film on the glass plate has a rocker hardness value of 12 and a pencil hardness of 6H. After being subjected to a 24 hour soak in tap water at room temperature, the same film has a rocker hardness of 4 and a pencil hardness of less than 6B. The cured film on the tin plate shows signs of blistering after being immersed in boiling distilled water for 1½ hours. After 6 hours of immersion in the boiling water, the film does not separate from the plate.

EXAMPLE 21

Cured films are prepared, following the procedure of Example 18, from a blend of 11.8 grams of the copolymer emulsion of Example 11, 8.2 grams of the ethoxyline

[1] See Example 16.

resin emulsion of Example 14 and 0.4 gram of DAP [1]. The films are prepared on both glass and tin panels. The cured film on glass has a rocker hardness of 11 and a pencil hardness of 6H. After being soaked in tap water for 24 hours at room temperature the film has a rocker hardness of 5 and a pencil hardness value of less than 6B. A cured film on tin plate blisters after immersion in boiling water for 1½ hours, but the film does not separate from the panel.

EXAMPLE 22

Cured films are prepared, following the procedure of Example 18, from a blend of 11.8 grams of the copolymer emulsion of Example 11, 8.2 grams of the ethoxyline resin emulsion of Example 14 and 0.4 grams of DAP [1]. The films are prepared on both glass and tin panels. The cured film on glass has a rocker hardness of 11 and a pencil hardness of 6H. After being soaked in tap water for 24 hours at room temperature the film has a rocker hardness of 5 and a pencil hardness value of less than 6B. A cured film on tin plate blisters after immersion in boiling water for 1½ hours, but the film does not separate from the panel.

EXAMPLE 23

Following the procedure of Example 18, from a blend of 12.1 grams of the copolymer emulsion of Example 12, 8.2 grams of the ethoxyline resin emulsion of Example 14 and 0.4 grams of DAP [1], a film is drawn down on a tin panel and is cured by baking for 30 minutes at 150° C. The film, when immersed for 6 hours in boiling distilled water shows no sign of blistering.

EXAMPLE 24

A cured film is prepared on a glass plate, using the procedure of Example 18, from a blend of 30.0 grams of the copolymer emulsion of Example 13, 18.6 grams of the ethoxyline resin emulsion of Example 14 and 0.9 gram of DAP [1]. The cured film has a rocker hardness value of 14 and a pencil hardness of H. After being soaked in tap water for 24 hours at room temperature, the same film has a rocker hardness of 12 and a pencil hardness value of HB.

The foregoing examples clearly illustrate the superior water resistance properties of films resulting from aqueous coating compositions of this invention. It will be noted that the flexibility and other physical properties of the films are also outstanding. It is also noted that the film-forming compositions formed in accordance with this invention can be pigmented if desired. It will be appreciated that in addition to pigments, other additives such as extenders, thickeners, preservatives, and plasticizers can be added. Such additions and modifications are within the skill of the art and are, therefore, within the scope of this invention.

What is claimed is:

1. A coating composition comprising an aqueous dispersion of
    (A) 1 to 91 parts by weight of an interpolymer of
        (1) 25 to 60 parts by weight of a half acid ester of
            (a) the acid HOOCCR:CRCOOH wherein R is selected from the group consistsing of hydrogen and methyl substituents, and
            (b) a monohydric alcohol selected from the group consisting of saturated aliphatic, mononuclear aromatic, and cycloalkane monohydric alcohols of from six to ten carbon atoms, and
        (2) 75 to 40 parts by weight, the total being 100 parts of
            (a) an ester selected from the group consisting of acrylic, methacrylic and crotonic acid esters of saturated aliphatic monohydric alcohols of two to four carbon atoms, and
            (b) a vinyl alcohol ester of a saturated aliphatic monocarboxylic acid of less than five carbon atoms, and
    (B) 9 to 99 parts by weight, the total being 100, of a glycidyl polyether of a polyhydric organic compound, said dispersion containing a non-ionic surfactant reactive with one of the two dispersed materials (A) and (B) and selected from the group consisting of
        (1) hydroxy terminated block copolymers of ethylene oxide with propylene oxide each having a hydrophobic propylene oxide section combined with at least one hydrophilic ethylene oxide section, and
        (2) hydroxyl terminated reaction products of ethylene oxide with a compound having over eight carbon atoms and selected from the group of
            (a) phenols
            (b) thiols
            (c) saccharides
            (d) aliphatic acids
            (e) alcohols, and
            (f) amines
    the surfactant being present in an amount of from 2 to 6 parts by weight per 100 parts of (A) plus (B).

2. As a new composition of matter, an aqueous medium containing dispersed therein
    (A) 1 to 91 parts by weight of an interpolymer of
        (1) 25 to 40 parts by weight of a half acid ester of
            (a) an acid selected from the group consisting of maleic, fumaric and citraconic acid, and
            (b) a mononuclear aromatic monohydric alcohol of from six to ten carbon atoms, and
        (2) 75 to 60 parts, the total being 100, by weight of
            (a) an ester selected from the group consisting of acrylic, methacrylic and crotonic acid esters of saturated aliphatic monohydric alcohols of two to four carbon atoms, and
            (b) a vinyl alcohol ester of a saturated aliphatic monocarboxylic acid of less than five carbon atoms, and
    (B) 9 to 99 parts, the total being 100, by weight of a liquid glycidyl polyether of a polyhydric phenol, and
    (C) a non-ionic surfactant reactive with one of the two dispersed materials (A) and (B) and selected from the group consisting of
        (1) hydroxy terminated block copolymers of ethylene oxide and propylene oxide each having a hydrophobic propylene oxide section combined with at least one hydrophilic ethylene oxide section, and
        (2) hydroxyl terminated reaction products of ethylene oxide with a compound having over eight carbon atoms and selected from the group of
            (a) phenols
            (b) thiols
            (c) saccharides
            (d) aliphatic acids
            (e) alcohols, and
            (f) amines
    the surfactant being present in an amount of from 2 to 6 parts by weight per 100 parts of (A) plus (B).

3. The composition of claim 2 wherein the interpolymer is a copolymer of monobenzyl maleate and methylacrylate, wherein the glycidyl polyether is a glycidyl polyether of bisphenol and wherein the non-ionic surfactant includes a protective colloid.

4. The composition of claim 2 wherein the interpolymer is a copolymer of monobenzyl maleate and methylmethacrylate wherein the glycidyl polyether is a glycidyl polyether of a dihydric alcohol and wherein the non-ionic surfactant includes a protective colloid.

5. The composition of claim 2 wherein the interpolymer is a copolymer of the 2-ethylhexyl half ester of maleic acid ---
[1] See Example 16.

and vinyl acetate, wherein the glycidyl polyether is the glycidyl polyether of resorcinol and wherein the non-ionic surfactant includes a protective colloid.

References Cited in the file of this patent

UNITED STATES PATENTS

| | | |
|---|---|---|
| 2,537,016 | Barrett | Jan. 9, 1951 |
| 2,643,238 | Crozier | June 23, 1953 |
| 2,780,567 | Kine | Feb. 5, 1957 |
| 2,798,861 | Segall | July 9, 1957 |
| 2,838,421 | Sohl | June 10, 1958 |
| 2,886,474 | Kine | May 12, 1959 |
| 2,949,438 | Hicks | Aug. 16, 1960 |
| 2,954,358 | Hurwitz | Sept. 27, 1960 |